3,308,113
METHOD OF PREPARING PROTEINACEOUS FOOD MATERIAL BY TREATING COLLAGENEOUS MATERIAL WITH AQUEOUS SULFITE SOLUTION AND ADDING TO THE RESULTANT PROTEINACEOUS MATERIAL A PEROXIDE
Vernon L. Johnsen, La Grange, and Eugene V. Matern and Raymond S. Burnett, Chicago, Ill., assignors to Wilson & Co., Inc., a corporation of Delaware
No Drawing. Filed Aug. 14, 1963, Ser. No. 301,962
7 Claims. (Cl. 260—118)

This invention relates to proteinaceous material having properties giving it utility in the food, cosmetic and pharmaceutical fields, and the like. More particularly, it relates to proteinaceous material derived from collagen-containing materials and to the method of making same. Still more particularly, it relates to a proteinaceous food product having foaming properties and reduced gelling properties.

In accordance with this invention, collagen-containing material is treated in aqueous solution with a sulfite agent to minimize development of color during heating and solubilization. The resultant aqueous solution is then treated with an agent capable of freeing nascent oxygen and beneficially altering the odor and flavor by a peroxide oxidation.

Protein additives derived from collagen, to be useful for incorporation in food, cosmetic and pharmaceutical products, generally must be low in color, have a low ash content and be bland with regard to flavor and odor.

Collagen can be, and ordinarily is, hydrolyzed to gelatin under extremely mild conditions so that a bland, light colored gelatin is formed which is capable of producing water solutions which are viscous and have the power to form strong gels at relatively low concentrations. High viscosity and gel forming ability are properties having advantages for some uses and disadvantages for other uses, for example use where the viscosity can interfere with the development of foam and result in products with undesirable texture and other physical characteristics, i.e., in the manufacture of aerated confectionery products, such as frappes, nougats, etc. In some cosmetic uses relatively high concentrations of protein are used in liquid preparations. If gelatin were used at these concentrations and at relatively low temperatures, gelation might occur which would be undesirable.

The gelling character of gelatin obtained from collagen can be reduced or largely destroyed by subjecting collagen or derived gelatin to high temperatures and pressures in the presence of steam and/or water. Treatment under these conditions is disadvantageous because the resulting solution of proteinaceous material has been rendered dark in color and possessed of an objectionable odor. One conventional method of lightening the color of gelatin products of reduced gelling character has been to bleach the aqueous solution of product, but while this treatment removes color from the solution, the solid product obtained still retains an undesirable odor and flavor and tends to exhibit a marked darkening during drying.

Proteinaceous material of non-gelling character as hereafter used means materials which are devoid of gelling character or are of reduced gelling ability. Processing of collagen directly to a non-gelling material is less costly due to the elimination of ordinary gelatin preparation steps. Usually, the non-gelling proteinaceous derivative is prepared in one step by subjecting the raw material to high temperatures and pressures in an aqueous system. The disadvantages of the one-step system are that the resultant non-gelling proteinaceous materials usually have objectionable odor and are too dark in color for many applications.

We have discovered that the treatment of collagenous material in the presence of sulfite ion or radical in solution during high-temperature treatment of collagenous material to impart non-gelling or reduced gelling character, inhibits development of appreciable color during the processing. The product of heat treatment in the presence of sulfite has color ratings which do not require bleaching and while the solutions have an objectionable odor similar to that resulting from the treatment in the conventional manner and in addition have an objectionable flavor including residual sulfite taste, the nature of the odor and flavor elements is such that they can now be eliminated by peroxide oxidation of the solution of the non-gelling proteinaceous material.

In accordance with the present invention, proteinaceous material from hydrolyzed protein obtained through treatment of collagen-containing material with heat and water is subjected to treatment in aqueous solution containing sulfite ion at elevated temperatures and pressures to produce a solution of proteinaceous material of at least reduced gel-forming character and the solution free of insoluble solids has incorporated therein a water soluble peroxide, preferably hydrogen peroxide, to effect an oxidation productive of a final liquid whose solids content can be recovered as dry, bland, light colored solids.

When the proteinaceous product is to be derived directly from collagen and associated proteins found in such sources as bones, skins, hides, sinews, fatty tissues and the like, by subjecting them to high temperatures and pressures with steam and/or water, reduction of the proteins to water soluble condition and reduction of the gelling ability of the proteins by heating in the presence of sufficient sulfite ion to minimize development of color, may be carried out in a single heating operation or one in which there is a partial solubilizing in the absence of sulfite ion followed by complete solubilizing and/or elimination of gelling character while heating in the presence of sufficient sulfite ion to minimize development of color.

Sulfite ion may be introduced into the aqueous solution of proteinaceous material by dissolving sulfur dioxide gas in the water to form sulfurous acid, by adding water soluble salts of sulfurous acid, and equivalent operations. The amount of sulfite ion required will vary with the magnitude of the heat treatment and the type of equipment utilized for the cooking operation. Sufficient sulfite must be present so that at least 1000 p.p.m., preferably 2000 p.p.m. (based on solids in solution), remain after the cooking operation to assure obtaining a light colored product. Other conditions being equal, the higher the temperature and the longer the time of heating, the larger the amount of sulfite required. Generally, an amount of sulfite agent is added which is capable of introducing into the solution between 0.1% and 5% of sulfite, i.e., $SO_3$ ion on a weight of the solids in solution basis.

Conditions of processing or the type of equipment used will govern the choice of the sulfite agent. Sulfur dioxide, which dissolves in an aqueous solution to form sulfurous acid may be used advantageously in jacketed pressure vessels that are not heated by direct steam because $SO_2$ introduction does not involve the introduction of ash forming cations. When vessels are used which are heated and pressurized by passing steam directly into the mixture, use of sulfur dioxide gas is uneconomic due to loss in the continuously vented gases. When the solutions of proteinaceous matter are to be heated in vented vessels, the common salts of sulfurous acid such as sodium sulfite, potassium sulfite, sodium bisulfite, potassium bisulfite and mixtures thereof are utilized because of their greater stability under the conditions of the pressure cooking.

For some specific food uses, a low ash and especially a low sodium content proteinaceous material is required. If such product properties are to be met, use of sodium and potassium salts of sulfurous acid as a source of sulfite is not desirable because these salts or their soluble decomposition products would be contained in the finished product. If sulfur dioxide gas cannot be used, then salts such as calcium and magnesium bisulfite are used for the introduction of sulfite ion because these salts are converted to water-insoluble salts or to water-insoluble sulfites or sulfates during the processing, most of which materials can be removed by settling, filtration, etc.

The extent of the heat treatment required to eliminate the gelling characteristic of the proteinaceous material will vary with the type of collagen-containing raw material and with the type of end product desired. A product with virtually no gel strength can be obtained from most collagenous materials by cooking at 35 pounds to 65 pounds gauge steam pressure, i.e., at temperatures in the range between about 275° F. and 310° F. for from 2 to 5 hours.

More in detail, the process of producing a nongelling proteinaceous product from collagenous material, may consist of an aqueous leach prior to heating or cooking, heating the collagenous material in an aqueous medium such as water or dilute acid at temperatures in the range between about 250° F. and 350° F. in the presence of between 0.1% and 1.5% of sulfite ion on a solids content of the solution basis, separating water solution and substantially all of the insoluble solids and fat, concentrating the water solution to a solids content in the range between about 20 and 55%, separating insoluble solids and a clear concentrate.

An aqueous leach of raw material is sometimes preferred because the collagen containing raw materials may contain naturally occurring soluble salts such as sodium chloride, potassium chloride, etc. in the tissue fluids which salts may be carried through in the process to the finished product. We have found that most of the natural occurring soluble salts can be removed and a non-gelling proteinaceous product of lower ash or lower sodium content produced by the steep. The leaching of the salts is facilitated by reducing the particle size of the raw materials being treated, as by comminuting. A small amount of sulfurous acid in the steep-water is effective in preventing bacterial growth during the steeping operation.

Proteinaceous material produced by a process involving an acid steep tend to exhibit greater freedom from turbidity when the solutions thereof are adjusted to or introduced into solution where a pH is maintained within the range of about 1.5 to about 2.5. Bone free collagenous material may be steeped in solutions of mineral acids such as hydrochloric acid and sulfuric acid. However, when bone is present, the useful acids are restricted to such as phosphoric acid and other acids which do not dissolve bones because mineral acids dissolve components of the bone and the dissolved material may contaminate the finished product. Following a steep in acid solution, the residual acid is removed by rinsing the solid material with water.

Collagen-containing material, subsequent to any steeping or washing treatment is subjected to a heating or cooking to solubilize the collagen. Following the cooking operation, insoluble solids are separated from the aqueous extract. The extract containing heat-hydrolyzed proteinaceous material will contain varying amounts of residual sulfite depending upon the amount of sulfurous acid or salts thereof utilized and the type of processing equipment used. The extract will usually have, in 1% solution, a Lovibond color in the range between yellow 1 to 4 and red 0.2 to 1.2 whereas a solution cooked in the absence of sulfite ion will generally show in 1% solution a Lovibond color in the range of yellow 5 to 8 and red 1.6 to 3.0.

Inasmuch as the extracts are dilute solutions, it may be preferable at this stage to effect a partial concentration. Extract solutions are generally concentrated by evaporation of water to a solids content of between 30% and 40% by weight. This preliminary concentrate may have suspended matter removed therefrom, for example, by mixing with filter aid and then filtering the resultant slurry through a precoated filter to obtain a substantially fat and insoluble solids-free solution of non-gelling proteinaceous material.

This extract will also generally contain amounts of sulfite which carry through and are detectable in the finished product unless subsequently eliminated or reduced. In order to produce a final product substantially free of sulfite flavor, the insoluble solids-free filtrate must contain less than 500 parts per million of sulfite as determined by a colorimetric method as described in Agricultural and Food Chemistry, vol. 7, No. 5, 351, May 1959. The sulfite ion can be reduced to amounts which are not detectable in the final product, and at the same time producing non-gelling proteinaceous products of improved flavor and odor by introducing peroxide agents capable of freeing nascent oxygen in solution.

For treatment of the solution of non-gelling proteinaceous material which has been heat treated in the presence of sulfite ion, the amount of peroxide required varies with the amount of sulfite ion present in solution, the temperature of heat treatment, etc. Optimum results are obtained when the amount of sulfite present does not exceed 2000 parts per million and the quantity of peroxide required does not exceed 100% and usually does not exceed 50% excess over the molar quantity equivalent to the molar quantity of sulfite. If the sulfite content is low, amounts of peroxide in the range between 200% and 400% in excess may be required.

Useful agents capable of freeing nascent oxygen in aqueous solution are hydrogen peroxide, barium peroxide, sodium peroxide and the like, as well as mixtures thereof. Generally, use of between about 0.05% and about 0.5% of peroxide on the basis of solids in solution will be sufficient for treatment of any sulfite-containing, heat treated collagen solution. Addition of peroxide in the above specified amounts substantially eliminates objectionable sulfite flavor, and substantially eliminates the strongly objectionable odor generated during the treatment to reduce the gelling character of the solution.

If a product having improved properties such as low ash, reduced salt flavor, etc., is desired, treatment with various combinations of anionic and cationic resins may be used subsequent to the peroxide oxidation operation. Treatment of the extract with anionic exchange resin followed by treatment with a strong acid resin such as Amberlite IR–120 H can reduce the ash content of a final product from a solution having 2.16% ash content to approximately 0.03% ash content.

In order to fully illustrate the invention, the following examples are included. These examples are intended to be illustrative only and are not to be construed as limitations on the invention.

EXAMPLE I

Twenty thousand pounds of ground edible grade hind pigs' feet are cooked using steam at 40 pounds pressure (288° F.) with 2500 gallons of water and 60 pounds anhydrous sodium bisulfite for two hours. The melted fat is drawn off and the liquid phase is decanted from the insoluble residue. The residue is again pressure cooked with 1000 gallons of water and 16 pounds of sodium bisulfite, and the aqueous extract isolated. The aqueous extracts are combined and evaporated to 50% solids. Approximately 5500 pounds of the 50% solids material is obtained.

The concentrated protein solution is then heated to

200° F. and passed through a precoated filter press. One half of the clear solution was dried on a double drum dryer without further treatment. The remaining half was treated with 0.15% hydrogen peroxide and then dried on the drum dryer.

When the water solutions of the untreated and peroxide-treated materials are tasted, the untreated sample has a predominant taste of sulfite whereas the peroxide-treated sample has no sulfite flavor and a slight salty taste. The odor of the solution of the untreated sample is much stronger and undesirable than the peroxide treated sample.

EXAMPLE II

Eighteen thousand pounds of grounds pigs' feet are soaked in cold water for two hours. The water is drained off and the ground feet covered with water a second time and again drained. The feet are then covered with cold water which contains 25 pounds of sulfur dioxide gas, and after steeping the ground feet overnight this solution is drained off. A calcium bisulfite solution is prepared by passing liquid $SO_2$ into a slurry of 27 pounds of calcium carbonate until the solution becomes clear. This solution, plus enough hot water to cover the ground feet, is then added. The material is then cooked with steam at 40 pounds gauge pressure (288° F.) for two hours. After cooking, the melted fat is drawn off, and the aqueous layer is removed. A second cook is carried out with added water at five pounds pressure for one half hour, the liquid extract removed and combined with the first cook-water extract, and evaporated to 50% solids. Approximately 4800 pounds of the concentrated material is obtained. The material was filtered and split into portions A, B and C. The portion A was drum dried. The dried product had a sulfite content of 1800 p.p.m. and an objectionable taste and odor. The portion B was treated with 0.15% of hydrogen peroxide. The portion B was drum dried. The $SO_2$ content in parts per million of $SO_2$ on a solids basis was less than 125. The ash content of the dried material was 1%. Solutions of the dried material were almost odorless and had only a slightly bitter taste.

EXAMPLE III

Portion C of the liquid product of Example II was treated with 0.25% of hydrogen peroxide. The hydrogen peroxide treated liquid product may be passed through a tower containing approximately 2 cubic feet of anionic exchange resin (Rohm and Haas XE-168). After 800 pounds of peroxide treated extract at 40% solids concentration is passed through the tower at a rate of a half gallon per minute, the pH of the composite sample of the effluent is 8.7. The $SO_2$ content in parts per million of $SO_2$ on a solids basis is less than 100. The pH of the treated extract is then adjusted to 5.5 with phosphoric acid and dried. The dried material has an ash content of approximately 0.4%.

In the event that it is desirable to avoid addition of an acid as the means of adjusting pH, the effluent from the anionic exchanger may be treated with a cationic exchange material such as Amberlite IR-120 H.

A typical use for the proteinaceous materials of this invention which have limited gelling character is as whipping agent, for example, in confectioneries such as nougat because it renders the mix low in viscosity at relatively low temperatures. Now, for the first time, it is possible to cast nougat at 135° F. for chocolate shell moulding which will have an excellent nougat texture upon cooling to room temperature.

The following example is illustrative of whipped confectionery prepared with proteinaceous material produced according to the method of this invention.

EXAMPLE IV

Casting nougat was prepared using the product of Example II as follows:

CASTING NOUGAT

STEP I—(FRAPPE)
 *Ingredients:*
  40 lbs. high conversion corn syrup.
  10 lbs. sugar.
  18 oz. product of Example II (dissolved in 5 pts. water).

*Procedure:*
  Place solution of product of Example II and one half of the high conversion corn syrup in beater and mix (don't beat).
  Cook remaining corn syrup and sugar to 240° F.
  Add and beat for twenty minutes.

STEP II
 *Ingredients:*
  30 lbs. sugar.
  55 lbs. high conversion corn syrup.
  3 oz. salt.
  1 lb. melted 92° F. vegetable fat.
  6 lbs. of the above frappe.
  Color and flavor to suit.

*Procedure:*
  Cook sugar, corn syrup and salt to 258° F.
  Stir in frappe, add flavor and fold in vegetable fat.

Although we have described preferred embodiments of the present invention, it will be understood that the description is intended to be illustrative, rather than restrictive, as details may be modified or changed without departing from the spirit or the scope of the invention.

We claim:
1. A method of preparing light colored, water soluble proteinaceous material from hydrolyzed protein obtained through treatment of collagen-containing material with heat and water at elevated temperatures and pressures to produce a solution of at least reduced gel-forming character which comprises heating collagen-containing material in aqueous solution containing sulfite ion in an amount in the range between 0.1% and 5% based on a weight of the solids in solution, at a temperature in the range between about 250° F. and 350° F., introducing into the resultant aqueous solution a water soluble peroxide agent in an amount in the range between 0.05% and 0.5% based on the weight of solids in solution, and recovering the proteinaceous product.

2. A method according to claim 1 in which the water soluble peroxide agent used is hydrogen peroxide.

3. A method according to claim 1 in which the water soluble peroxide agent used is a combination of hydrogen peroxide and barium peroxide.

4. A method according to claim 1 in which the heating is a cooking at between 35 pounds and 65 pounds gauge steam pressure which corresponds to a temperature in the range between about 275° F. and 310° F. for a period in the range between about 2 hours and about 5 hours.

5. A method according to claim 1 in which the sulphite containing solution of collagen-containing material, prior to treatment with water-soluble peroxide agent, is concentrated to a solids content in the range between about 20% and about 40% and a substantially solids-free concentrate is prepared for treatment with the water soluble peroxide agent.

6. The method according to claim 5 which includes the step of drying the peroxide treated concentrate to recover a powdered product.

7. A method according to claim 1 which also involves subjecting the water soluble peroxide agent treated solution to treatment with material selected from the group consisting of anionic and cationic exchange resins before recovery of the proteinaceous product.

References Cited by the Examiner

UNITED STATES PATENTS 2,928,822  3/1960  Johnsen et al. ------ 260—117

OTHER REFERENCES

The Merck Index, seventh ed., Merck Co., Rahway, N.J., 1960 (p. 1003 relied on).

WILLIAM H. SHORT, *Primary Examiner.*

SAMUEL H. BLECH, *Examiner.*

H. S. CHAIN, *Assistant Examiner.*